United States Patent [19]

Kertzman

[11] Patent Number: 4,808,201
[45] Date of Patent: Feb. 28, 1989

[54] CONNECTOR CONSTRUCTION FOR FLUID DRYING TUBE

[75] Inventor: Jack Kertzman, Pine Beach, N.J.

[73] Assignee: Perma Pure Products, Inc., Toms River, N.J.

[21] Appl. No.: 118,551

[22] Filed: Nov. 9, 1987

Related U.S. Application Data

[63] Continuation-in-part of Ser. No. 909,694, Sep. 19, 1986, Pat. No. 4,705,543.

[51] Int. Cl.4 ............................................. B01D 53/22
[52] U.S. Cl. ......................................... 55/158; 73/23; 210/490
[58] Field of Search ..................... 55/16, 158; 210/490

[56] References Cited

U.S. PATENT DOCUMENTS

| | | | |
|---|---|---|---|
| 3,437,357 | 4/1969 | Rubin | 55/158 X |
| 3,446,359 | 5/1969 | Loeb et al. | 210/490 |
| 3,523,568 | 8/1970 | van Leeuwen | 55/16 X |
| 3,547,272 | 12/1970 | Shaines et al. | 210/490 X |
| 3,666,109 | 5/1972 | Goeldner | 210/490 X |
| 3,676,193 | 7/1972 | Cooper, IV et al. | 210/490 X |
| 3,735,558 | 5/1973 | Skarstrom et al. | 55/16 |
| 3,746,591 | 7/1973 | Banfield | 210/490 X |
| 3,773,181 | 11/1973 | Calderwood et al. | 210/490 X |
| 3,850,203 | 11/1974 | Shobert | 210/490 X |
| 3,891,556 | 6/1975 | Richardson et al. | 210/490 X |
| 4,031,012 | 6/1977 | Gics | 55/158 X |
| 4,509,359 | 4/1985 | Gedeon et al. | 73/23 |
| 4,517,720 | 5/1985 | Otstot et al. | 55/16 X |
| 4,539,113 | 9/1985 | Tomita et al. | 55/158 X |
| 4,631,128 | 12/1986 | Coplan et al. | 55/158 X |
| 4,671,809 | 6/1987 | Taketomo et al. | 55/158 |
| 4,705,543 | 11/1987 | Kertzman | 55/158 |

FOREIGN PATENT DOCUMENTS

| | | | |
|---|---|---|---|
| 1213836 | 4/1960 | France | 55/158 |
| 74433 | 4/1987 | Japan | 55/16 |

Primary Examiner—Robert Spitzer
Attorney, Agent, or Firm—Robert M. Skolnik

[57] ABSTRACT

A method and apparatus for sealing and affixing connectors to membrane tubing reinforced by braided netting and used for drying of fluids employs mechanical fusion of the material of the braid or of an overlay formed of thermoplastic material (or a combustion of both) to produce the mechanical seal between the tubing and a connector. The seal includes an inner tubular insert (which may be formed of stainless steel, ceramic, or glass). The insert is placed in the end of the drying tube. The connector is fused to the tube by applying high temperature and pressure to the area of the tubing over the insert. This causes fusion of either the braiding material itself or fusion of a thermoplastic overlay placed over the end of the tubing surrounding the insert.

12 Claims, 1 Drawing Sheet

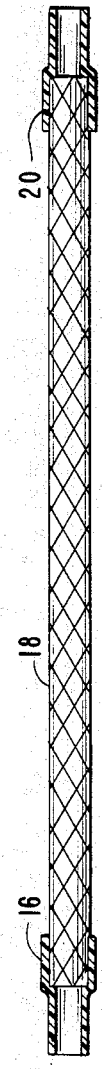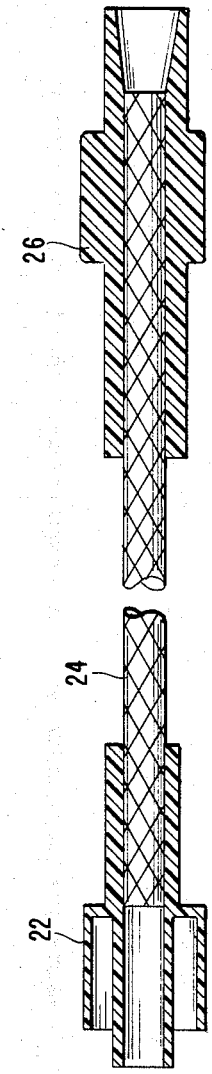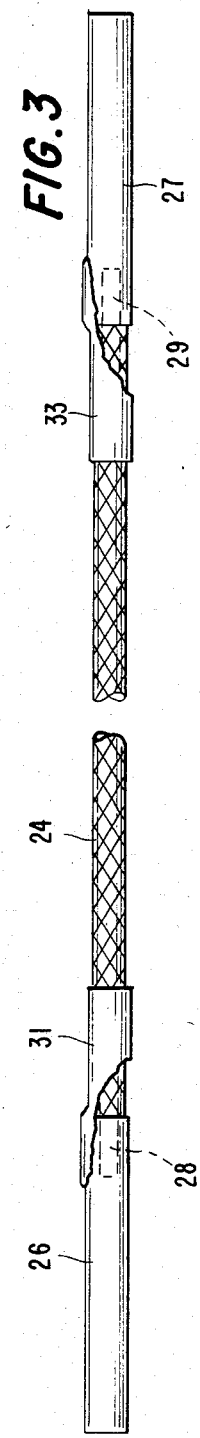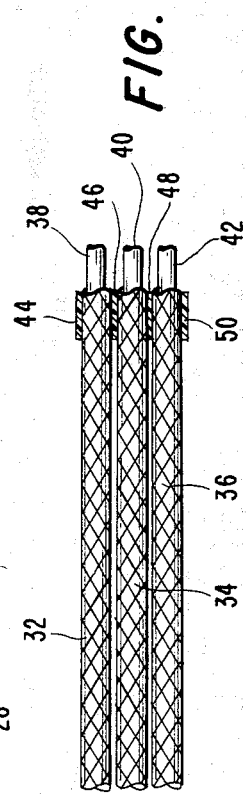
FIG. 1
FIG. 2
FIG. 3
FIG. 4

CONNECTOR CONSTRUCTION FOR FLUID DRYING TUBE

CROSS-REFERENCE TO RELATED APPLICATIONS

This application is a continuation-in-part of my U.S. patent application Ser. No. 909,694, filed Sept. 18, 1986, is now U.S. Pat. No. 4,705,543 issued Nov. 10, 1987, commonly assigned.

FIELD OF THE INVENTION

The present invention relates to flexible membrane drying and specifically to forming connectors on and affixing connectors to reinforced membrane tubes which operate without interference from and problems caused by water condensation in the tube. The construction of the tube is such that its materials are selected such that the humidity and temperature of the gases flowing through the tube are equalized to those of the ambient air surrounding the tube or a dry gas enclosed in a shell surrounding the dehydration tube. Such tubes are fluid drying tubes and are made of materials which are mechanically protected by reinforcement such as the placement of the tube inside a plastic monofilament or metal wire braided netting.

The tube is formed of extrudable plastic materials which permit water vapor to diffuse through the walls of the tube but inhibit the ability of gases in the sample from so diffusing. The water vapor diffuses through the walls of the tube from the area of higher concentration to that of lower concentration level. In practice, when highly humid gas is sampled, the water vapor in the sample diffuses through the tube wall out into the dry air or gas. Thus, condensation in the sampling tube is prevented from occurring and the problems occasioned by such condensation are eliminated.

The tubes find application in medicine in patient monitoring of expired breath, and in industry for process drying. The tubes are also employed for sampling emissions in pollution measurement and control and for process dehydration of fluids.

One of the problems that has arisen in the manufacture and use of these drying tubes is the need to affix connectors to the tubes so as to enable the tubes to be coupled to an inlet and an outlet for fluid to be dried. The present invention is directed to a method and apparatus for coupling suitable connectors to the drying tubes described in my aforementioned U.S. Pat. No. 4,705,543.

DESCRIPTION OF THE PRIOR ART

U.S. Pat. No. 4,509,359 to Gedeon, et al. discloses a method and apparatus for measuring a gas inhaled or exhaled in patient monitoring. A gas sampling tube is employed which comprises a thin tube of a fluorosulfonyl polymer, the outer surface of which is in free contact with ambient air. The temperature and humidity of the breathing gas is brought into agreement with the temperature and humidity of the ambient air. The tube described in the patent is stated to include over part of its length, a section of material having high selective and reversible water-absorption properties, and that this section has its outer surfaces in free contact with the ambient air.

U.S. Pat. No. 3,735,558 commonly assigned and co-invented by the inventor of the present invention, discloses the use of perfluro sulfonic acid polymeric hollow tubes for separating and drying of fluids and gases.

SUMMARY OF THE INVENTION

The drying and diffusion capabilities of certain materials have long been known in the art. The present invention uses such materials but encloses the permeable tube in a braiding of tightly wrapped material such as natural or plastic mono-filament, or metal wire over the diffusion tubing. The tubing is, preferably, formed of a sulfonate as taught in the aforementioned U.S. Pat. No. 3,735,558. Other extrudable ion exchange tubing such as the cation and anion polymers of polyethylene and other low molecular weight hydrocarbons may be used, as well. The braiding offers several advantages as follows: mechanical protection of the thin wall tubular membrane by preventing it from being touched by any outside material or by the person; mechanical strength permitting the tubing to be handled in a normal manner for ordinary tubing without the need for special concerns or special handling to prevent the tubing from stretching; and the tubing can be bent without developing kinks, pinches or compression resistance. The foregoing can be accomplished using tubing having even thinner walls than that used unbraided. The thinner walls produce increased transport rates of water through the membrane.

In certain of the applications of such tubing discussed in my U.S. Pat. No. 4,705,543, the mechanical integrity of the tubing is improved when the section of braided tubing is packed in a bed of other materials. The use of metal as the braiding material offers improved heat and cold transfer for the tubing walls and improved temperature control capability.

If the tubing sections are used adjacent to each other as by direct physical contact, the braiding serves as a spacer to prevent the surfaces of the membranes from overlaying each other thereby decreasing the exposed surface area and increasing inefficiency as a result. Further, the braiding improves the mixing of gas exterior to the tubing (known as the "sweep gas") and its distribution on the outer tubing surface.

The foregoing is accomplished without any reduction in the ability of the tubing to remove moisture from a sample.

Several embodiments of apparatus employing the improved braided tubing of my invention are described in my U.S. Pat. No. 4,705,543. One of these embodiments employs the braided tubing embedded in a desiccant bed. This desiccant bed enhances the ability of the tube to remove moisture from a sample by increasing the difference in relative humidity between the sample and the ambient environment external to the tube. The braiding also protects the tubing from mechanical or chemical interference from the desiccant. This apparatus is used to perform field tests of emissions in pollution control applications.

Another embodiment in U.S. Pat. No. 4,705,543 is used in process drying where the tube can now be employed in pressures which are ten to twenty times greater than those in which the unbraided tubing can be safely employed.

A further embodiment wraps resistance wire around the braiding so that the tube can be heated electrically. In another embodiment, the tubing may be covered with metal wire to conduction heating and cooling. These later embodiments all recognize that the rate of transfer by diffusion through the tubing doubles for each 10° C. in temperature differential which can be induced.

In all of the above embodiments, connectors are required to be affixed to the tubing (either braided tubing or unbraided tubing), so that the tubing can be practically employed by connecting the tubing to other apparatus serving as an inlet and outlet for fluid passing through the tubing.

The prior art affixed the connectors to the tubing using a thermoset resin (epoxy) to affix the connector to the tubing.

Problems occur in affixing and sealing the connector to the tubing to produce a sealed connection which will survive the environments of use without failure. In the medical field, for example, the tubing must be sterilized. Such sterilization processes involve the use of steam or chemicals. If the sterilization process is repeated, multiple applications of steam or chemicals or both may be expected. The connectors must be affixed to the tubing so that the connection will survive the sterilization without cracking and thereby developing leaks as well as causing connector failure.

In other uses, the tubing may be subjected to chemicals of different types and the connector seal must have sufficient integrity to survive these chemicals.

Similarly, the tubing may be subject to environments of differing temperature and pressure causing expansion and contraction of the tubing. The connector seal must be capable of surviving these mechanical changes.

The thermoset resin (epoxy) of the prior art had poor chemical resistance and poor properties of thermal expansion. In addition, the resin weakens the membrane drying tube as well as deactivates the outside portion of the tube over which the resin is placed. further, the resin has poor reaction to cleaning and regeneration with nitric acid.

The method and apparatus for affixing connectors to membrane tubing of the present invention does not employ any thermoset resin. The connector of the invention employs mechanical fusion of the material of the braid or of an overlay formed of thermoplastic material (or a combination of both) to produce the mechanical seal between the tubing and a connector. The seal of the present invention includes an inner tubular insert (which may be formed of stainless steel, ceramic, or glass). The insert is placed in the end of the drying tube. The connector is fused to the tube by applying high temperature and pressure to the area of the tubing over the insert. This causes fusion of either the braiding material itself or fusion of a thermoplastic overlay placed over the end of the tubing surrounding the insert.

A principal object of the invention is the provision of a method and apparatus for forming and sealing a connector to a reinforced tubular membrane device that can transport moisture from a gas sample to the environment. The tubing may have a layer of braiding surrounding the tube by using braiding over the permeable material.

Another object of the invention is the provision of a gas sampling moisture selective tube which is mechanically stronger than tubing formed of the diffusion material, alone. Another object of the invention is the employment of braided permeable tubing in a desiccant bed to produce portable sampling devices for pollution measurement or control applications. A further object of the invention is the provision of a reinforced membrane tubing which can be used at much higher pressures than to which the tubing was previously capable of being subjected.

Another object the invention is to provide a fusion method of affixing a connector on the drying tubing which produces a seal which will not leak and which will retain its integrity.

BRIEF DESCRIPTION OF THE DRAWINGS

These as well as further objects and advantages of the invention will become apparent to those skilled in the art from a review of the following detailed specification reference being made to the accompanying drawings in which:

FIG. 1 is a side view of the braided tube of the invention;

FIG. 2 is a side view of the tubing of FIG. 1 with LUER ® fittings for medical applications;

FIG. 3 is a side view, partially in section, of a tube employing the connector structure of the invention; and FIG. 4 is a section view of a bundle of tubes of the type shown in FIG. 1 employing a plurality of connectors.

DETAILED DESCRIPTION OF THE INVENTION

FIG. 1 is a side view of the braided tubing of my invention. The braided tubing is shown at numeral 18. Two connectors, 16 and 20 are coupled to the ends of the tubing for connection to other tubing or to other apparatus. The tubing of FIG. 1 is the extruded placed materials discussed in my U.S. Pat. No. 3,735,558 or it may be the extrudable ion exchange tubing discussed herein.

FIG. 2 is a side view of another embodiment of my invention. In FIG. 2, the braided section of tubing 24 has male and female LUER ® fittings connected thereto. The male fitting is denoted by numeral 22 while the female fitting is denoted by numeral 26. These LUER ® fittings are well known in the medical arts and the embodiment of FIG. 2 is specifically suited to patient monitoring as disclosed in the aforementioned Gedeon et al Pat. No. 4,509,359.

The connectors in FIG. 1 and FIG. 2 are affixed onto the tubing by the invention herein as shown in FIG. 3. As discussed above, and is shown in FIG. 3, each end of braided tubing 24 has a hollow tubular insert 28, 29 placed therein. Each of the inserts 28 and 29 may be formed of stainless steel, glass, or ceramic materials. The connectors, such as plastic tubes 26 and 27, are fused to the tubing 24 by application of heat and pressure on heat shrinkable material 31, 33 to form a fusion seal between connectors 26, 27 and braided tube 24. The material of heat shrinkable seal sections 31, 33 is thermoplastic and each section 31, 33 is formed as an overlay on the braided tube over the inserts 28, 29.

FIG. 4 shows a "bundle" of tubes of the type shown in FIG. 1 formed by fusion to each other. Each of the tubes, 32, 34, and 36, each have a tubular insert 38, 40 and 42 inserted therein in the manner described in connection with FIG. 3. In this embodiment, either the fusion seal is formed of the material of the tube's braiding itself, in a manner similar to that described in connection with FIG. 3 above, or with a plurality of thermoplastic material overlays (such as 31 in FIG. 3) designated 44, 46, 48 and 50 in FIG. 4 is formed over each of the ends of the braided tubes over the tubular inserts. Similarly, a relatively large thermoplastic overlay may be employed over the ends of the entire bundle of fused tubes.

The tubes forming the bundle may be fused into the circular shape shown in FIG. 4 or to other shapes such as square or hexagonal to more geometrically mate the surfaces of the tubes forming the "bundle".

The method of the invention involves the application of heat and pressure to fuse the area of braiding and tubing material over the tubular insert. This heat and pressure may be applied to a thermoplastic overlay which covers both a portion of the braided tubing and a portion of the connector or to the portion of the braiding located over the insert. A combination of both overlay and braiding may be used to form a "bundle".

The fusion approach thus forms a seal between tubing and connector or between tubes themselves. This seal is serviceable in that it resists failure under conditions of expansion/contraction, sterilization, and chemical exposure. If resistance to particular chemicals is desired, specific selection of braiding material to resist these chemicals can be made in the manner discussed in the aforementioned U.S. Pat. No. 4,705,543.

In a direct fusion, the braiding may be formed of thermoplastic materials such as polyester, polypropylene, or polyethylene, or fluorocarbons such as vinylidene fluoride or fluorated ethelylene propylene (FEP).

The fusion can be performed at the temperature range of 350°–400° F. and a pressure range of between 300–400 PSIG.

The material of the tubular insert must be chemically inert such as 300 Series stainless steel, anodized or TEFLON® coated aluminium or nickel. Alternatively, the insert may be formed by ceramics or glass. The requirements are that the material be strong enough to withstand the pressures and temperatures of the fusion process.

Alternatively, if the braiding material is not fusible, or the wall thickness of a section of unbraided tubing is too thin, a layer of fusible material may be applied over the end portion of a braided or unbraided section of tubing and then the fusion process with the tubular insert can be performed.

The present invention has solved many of the problems associated with the connection approaches of the prior art. The material of which the membrane tubing is formed is characterized by expansion and contraction. In order to stabilize the connection points, the membrane material must be deactivated. This deactivation is accomplished on the inner surface of the membrane by the tubular insert and on the outer surface of the membrane by the fused layer of braiding or the fused layer of thermoplastic overlay.

As modifications to the foregoing may be made without departing from the spirit and scope of my invention, what is sought to be protected is set forth in the appended claims.

I claim:

1. A fluid drying device comprising: a section of tubing formed of a first material having selective and reversible water-absorption properties, the surface of said tubing covered with a braided netting of a second material, means for connecting said tubing to receive fluid, said connecting means including a chemically inert tubular core inserted into said tubing, and a connector fused to said braiding and said tubing in proximity to said core.

2. The device of claim 1 wherein a portion of said braided netting is fused to said connector.

3. The device of claim 1 further including an overlaying section of thermoplastic material mounted over a portion of said connector and a portion of said braided tubing in proximity to said tubular insert, said thermoplastic material being fused to said connector and to said braided tubing.

4. A fluid dryer having an inlet end and an outlet end, means for supplying a fluid to be dried to said inlet end, a plurality of sections of tightly braided gas absorption membrane tubing mounted for fluid communication with said inlet end and said outlet end, said sections of tubing being hollow for receiving a portion of said fluid to be dried; sealing and mounting means including a hollow chemically inert tubular core for each of said sections of tubing mounted in the ends of each of said sections of tubing; said sealing and mounting means forming a bundle of sections of said tubing.

5. The dryer of claim 4 wherein said sealing and mounting means includes a layer of thermoplastic material formed about said sections of tubing in proximity to said cores for fusing said tubes to each other.

6. A fluid drying device comprising: a section of tubing formed of a first material having selective and reversible water-absorption properties, means covering the surface of said tubing for protecting the tubing from the effects of handling, enhancing the heat transfer properties of said tubing, increase the mechanical strength of said tubing and increase the pressures to which said tubing can be subjected; connector means coupled to said tubing, said connector means including a chemically inert core inserted into said tubing and a connector fused to said tubing about a portion of said core.

7. The device of claim 6 wherein a portion of said surface covering means is fused to said connector.

8. The device of claim 6 further including an overlaying section of thermoplastic material mounted over a portion of said connector and a portion of said braided tubing in proximity to said tubular insert, said thermoplastic material being fused to said connector and to said braided tubing.

9. The method of fusing a connector to a membrane fluid drying tube comprising the steps of: inserting a hollow chemically inert core into the tubing; mounting a connector over the tubing in proximity to said core; and heating and pressurizing the section of tubing beneath the connector and surrounding the core to fuse the connector to the tubing.

10. The method of forming a bundle of membrane fluid drying tubes comprising the steps of: inserting hollow chemically inert cores into the ends of each of the tubes; and applying heat and pressure to the area of the tubes in proximity to said cores to fuse said tubes together.

11. The method of fusing a connector to a membrane fluid drying tube comprising the steps of: inserting a hollow chemically inert core into the tubing; mounting a connector over the tubing in proximity to said core; applying thermoplastic material to a portion of said connector and a portion of said tubing in proximity to said core; and heating and pressurizing the section of tubing beneath the connector and surrounding the core to fuse the connector to the tubing.

12. The method of fusing a connector to a braided membrane fluid drying tube comprising the steps of: inserting a hollow chemically inert core into the tubing; mounting a connector over the tubing in proximity to said core; and heating and pressurizing the section of tubing beneath the connector and surrounding the core to fuse a portion of said braiding to seal and affix the connector to said membrane drying tube.

* * * * *